United States Patent [19]

Wilms et al.

[11] 4,294,703

[45] Oct. 13, 1981

[54] HYDROGEN PEROXIDE TREATMENT OF EFFLUENT

[75] Inventors: Klaus G. Wilms, Dormagen; Helmut Waldmann, Leverkusen, both of Fed. Rep. of Germany

[73] Assignee: Bayer Aktiengesellschaft, Leverkusen, Fed. Rep. of Germany

[21] Appl. No.: 165,422

[22] Filed: Jul. 2, 1980

[30] Foreign Application Priority Data

Jul. 11, 1979 [DE] Fed. Rep. of Germany ....... 2927912

[51] Int. Cl.³ ................................................ C02F 3/00
[52] U.S. Cl. ................................... 210/631; 210/759; 210/763; 210/627
[58] Field of Search ......................... 210/18, 51, 52, 53, 210/63 R, 63 Z, 50, 626, 627, 628, 631, 722, 721, 759, 763

[56] References Cited

U.S. PATENT DOCUMENTS

| | | | |
|---|---|---|---|
| 2,070,856 | 2/1937 | Butterfield | 210/63 R |
| 2,809,933 | 10/1957 | Halvorso | 210/63 R |
| 3,171,800 | 3/1965 | Rice | 210/63 R |
| 3,530,067 | 9/1970 | Friedman | 210/18 |
| 3,746,639 | 7/1973 | Bewley | 210/18 |
| 3,780,163 | 12/1973 | Callighar | 210/63 Z |
| 3,846,293 | 11/1974 | Campbell | 210/18 |
| 4,017,392 | 4/1977 | Hamer | 210/63 R |
| 4,178,239 | 11/1979 | Lowther | 210/18 |

FOREIGN PATENT DOCUMENTS

| | | | |
|---|---|---|---|
| 646440 | 8/1962 | Canada | 210/63 R |
| 2430848 | 1/1976 | Fed. Rep. of Germany | 210/63 R |
| 46-41797 | 12/1971 | Japan | 210/63 R |
| 51-2252 | 1/1976 | Japan | 210/63 R |
| 51-32057 | 3/1976 | Japan | 210/63 R |
| 52-15167 | 2/1977 | Japan | 210/63 R |
| 52-16865 | 2/1977 | Japan | 210/63 R |

*Primary Examiner*—Ernest G. Therkorn
*Attorney, Agent, or Firm*—Sprung, Felfe, Horn, Lynch & Kramer

[57] ABSTRACT

In the process for decreasing the COD-content of effluent by treating with hydrogen peroxide in the presence of a transition metal compound, the improvement which comprises adding to the effluent about 5 to 40% of the calculated quantity of $H_2O_2$ required for the total oxidation of the total COD-content of the effluent, the transition metal compound being dissolved in the effluent in an amount such that the molar ratio of $H_2O_2$ to transition metal is from about 30:1 to 3:1, bringing the pH initially to about 2 to 9, maintaining the effluent at about 5° to 100° C., and separating from the effluent whatever material has flocculated. Thereafter the effluent can be subjected to conventional biological degradation such as by the activated sludge process.

6 Claims, No Drawings

HYDROGEN PEROXIDE TREATMENT OF EFFLUENT

In some processes, effluent is produced which cannot be decomposed biologically using the conventional methods of activated sludge treatment, or the substances it contains often present problems in biological purification plants because the activated sludge cannot adapt fast enough to the different chemicals in the effluent. This applies particularly where there is a fluctuating load and a discontinuous yield of effluent. Adaptation difficulties are also noticed with non-toxic substances in the effluent as a result of temporal and quantitative fluctuations of the resulting effluent.

It is known to use hydrogen peroxide in the presence of transition metal compounds as an oxidation agent for the purification of effluent. Thus, the suggestion is made in Japanese Patent Application No. 51-132,057 of adding to the effluent a quantity of hydrogen peroxide which is theorectically necessary for total oxidation, based on the COD-content of the effluent. However, using a quantity of hydrogen peroxide which is stoichiometrically equivalent to the COD-content of the effluent only results in lowering the COD in the effluent and a residual content of COD remains, because the hydrogen peroxide which is used is not fully utilized for decreasing the COD.

In order to achieve an extensive COD-decrease, the quantity of hydrogen peroxide which is added can be increased. Thus for example, Japanese Patent Application No. 51-136,947 suggests an addition of hydrogen peroxide which is more than twice the amount theoretically required for total oxidation according to the COD-content of the effluent. This increase in the addition of hydrogen peroxide does indeed provide a possibility of decreasing the COD-content, but a residual content of COD always remains in the effluent and the hydrogen peroxide utilization in this case is less than 50%.

The suggestion is made in Japanese Application No. 53-063,760 of simultaneously introducing oxygen during the course of treating the effluent with hydrogen peroxide in the presence of transition metal compounds, as otherwise a decrease in the COD-content cannot be achieved.

However, in the suggested process, the highly activated hydrogen peroxide which is used can never be fully utilized; oxygen must also be introduced to some extent into the effluent to be treated, and operational disturbances occur in all cases in the subsequent effluent purification step according to the activated sludge process.

It has now been found in contrast to this that the COD-content of effluent can be decreased to a surprising extent using hydrogen peroxide in the presence of transition metal compounds without disadvantage to a subsequent biological effluent purification process, if the effluent is initially treated with hydrogen peroxide in the presence of transition metal compounds under certain conditions and then subjected to a flocculation adsorption. Surprisingly, as a result of this specific treatment, the residual COD-content of the effluent also becomes biologically decomposable.

The subject of the present invention is therefore a process for decreasing the COD-content of effluent by treating with hydrogen peroxide in the presence of transition metal compounds, which is characterized in that about 5 to 40% of the calculated quantity of hydrogen peroxide required for total oxidation of the total COD-content of the effluent is added to the effluent, a temperature of about 5° to 100° C. being maintained during the treatment, a starting pH-value of approximately from 2 to approximately 9 being set in the effluent and in that water-soluble metal compounds are added to the effluent in an amount such that the molar ratio of added hydrogen peroxide to the transition metal compounds in the effluent is approximately from 30:1 to approximately 3:1, and the resulting flocculated material then being separated, optionally after the addition of basic substances.

By means of the present invention, biologically non-decomposable or only problematically decomposable substances contained in the effluent can surprisingly be converted into biologically-decomposable substances, i.e. after the treatment of the invention using hydrogen peroxide in the presence of transition metal compounds and the subsequent flocculation absorption, the remaining COD-content of the effluent is biologically decomposable.

It is another surprising fact that as a result of the combination of the hydrogen peroxide treatment—using a hydrogen peroxide dosage of from 5 to 40% based on the COD-content of the effluent to be treated—with a flocculation adsorption and precipitation in the effluent thus treated, a COD-decrease can be achieved which is substantially greater than is to be expected from the sum total of the individual procedural steps carried out separately. Thus, a COD-decrease of 48,500 mg/l is achieved for example by the combination of these two methods of effluent purification under the specific conditions of the invention, with an effluent having a COD-content of 80,000 mg/l. This is 14.500 mg/l more than the COD-decrease which would be expected by the addition of the process steps carried out separately. The combination according to the invention of the hydrogen peroxide treatment with the subsequent flocculation adsorption and precipitation produces an additional COD-decrease under the specific conditions of the invention, in the case described above of 42.6%.

The COD-content in the resulting effluent is initially established by analytical means and the effluent can be treated both continuously or discontinuously. The effluent is then brought to a temperature of between from approximately 5° C. to approximately 100° C., preferably approximately from 20° C. to approximately 45° C., and most preferably from approximately 25° C. to approximately 34° C. The pH value of the effluent is adjusted to values of between from approximately 2 to approximately 9 preferably from approximately 3.5 to approximately 6.5, most particularly preferred being from approximately 4 to approximately 5.

The effluent is then treated with hydrogen peroxide in a quantity of from 5% to 40% of the quantity theoretically required for the total oxidation of the COD-content. Preferably, about 10 to 35% of the calculated quantity of $H_2O_2$ is added, about 15 to 30% being particularly preferred. Surprisingly during this treatment, the added hydrogen peroxide is completely utilized in decreasing the COD-content, while with the stoichiometric or over-stoicihiometric dosage of hydrogen peroxide, based on the COD-content, a large amount of the hydrogen peroxide does not contribute to any further COD-decrease.

The hydrogen peroxide is decomposed using soluble or at least partially soluble transition metal compounds.

For this purpose, copper, aluminum zinc and/or iron compounds are preferably used, iron compounds being most particularly preferred. At least partially soluble, as well as iron (II)—and/or iron (III)—compounds and also iron in its elementary form e.g. in the form of scrap iron, are used as iron compounds; also, both oxidic as well as sulphidic ores, such as for example magnetite, hematite and limonite or pyrite. In many cases, iron (III) compounds, such as $Fe(OH)_3$, $Fe_2O_3$, $FeCl_3$ and/or $Fe_2(SO_4)_3$ are selected as the catalyst. Iron (II) compounds, such as $FeO$, $Fe(OH)_2$, $FeCl_2$ and $FeCO_3$ are preferably used as catalysts and $FeSO_4.7H_2O$ or so-called green salt from the preparation of titanium dioxide is most preferably used as a catalyst. When using elementary iron as the catalyst, this is preferably solubilized in an acidic effluent, so that the total effluent is prevented from becoming salified.

The molar ratio of hydrogen peroxide to iron is determined by the nature and concentration of the substances contained in the effluent, on the reaction temperature and the flocculation effect which is desired in subsequent neutralization. Where there is an easily oxidizable effluent and a temperature range of, for example, from 20° to 35° C., the process is carried out with a molar ratio of hydrogen peroxide to iron of about 30:1 to 3:1, preferably about 20:1 to 10:1, the most particularly preferred ratio being about 18:1 to 13:1. With higher temperatures, smaller quantities of iron compounds are also sufficient, for example where there is the same effluent but with a temperature range of from 40° to 60° C., the process can be carried out with a molar ratio of hydrogen peroxide to iron of about 100:1 to 60:1. Where there are even higher temperatures, the molar ratio increases accordingly. In contrast to this however, substances contained in the effluent which complex iron or are themselves difficult to oxidize under usual conditions, such as for example phosphates, phosphoric acid derivatives and N-heterocyclics, require doses of iron in the molar ratio of hydrogen peroxide to iron of about 3:1 or lower.

The reaction can be carried out in the present invention under isothermally or adiabatic conditions. According to the invention, the method is carried out in a temperature range of approximately from 5° C. to approximately 100° C., preferably approximately from 20° C. to approximately 45° C., and most particularly preferred at approximately from 25° C. to approximately 35° C. In special cases, with isothermal as well as adiabatic reaction conditions, the stated temperature range can be exceeded or dropped below, whereby under certain circumstances, the method can also be carried out under increased or decreased pressure.

After treating the effluent with hydrogen peroxide in the presence of transition metal compounds, preferably iron compounds, the treated effluent continues to be treated biologically or in exceptional cases, is treated in another manner. The effluent is acidic and must be adjusted, optionally to the pH-value which is necessary for the biological treatment. This partial step of the process of the invention is therefore carried out using basically reacting substances, for example, potassium hydroxide and sodium hydroxide, preferably, however with calcium compounds, for example calcium oxide, calcium hydroxide and/or calcium carbonate and most preferably using milk of lime. Here, the transition metal ions present in the effluent, e.g. preferably iron, are precipitated as hydroxide, thereby causing a flocculation adsorption The substances which in rare cases have already been previously flocculated or are flocculated and precipitated during the addition of basic substances or optionally after the addition of auxiliary flocculants, are separated, preferably by filtration, sedimentation, flotation or centrifugation.

Surprisingly, using the process of the invention, a COD-decrease of the effluent can be achieved which is higher than can be achieved as a result of the COD-decrease by means of a separate hydrogen peroxide treatment and flocculation adsorption. In other words, the treatment of effluent according to the invention using substantially less than the stoichiometric quantity of hydrogen peroxide-based on the quantity which is necessary for the theoretical complete oxidation of the total COD-content and the subsequent flocculation absorption, does not produce merely the sum total of the COD-decrease from both partial steps, but a much larger decrease.

Therefore, using the process of the invention, not only biologically decomposable products and a practically quantitative hydrogen peroxide utilization are obtained, but also a decrease of the COD-content of the effluent which is greater than calculated.

The process of the invention is now described in more detail with reference to the following examples:

EXAMPLE 1

A mixed effluent had the following COD values, $BOD_5$ values and pH values:

COD: 68,500 mg/l
$BOD_5$: 9,800 mg/l
pH: 4.7

The noxious effect of this effluent in respect of *Pseudomonas fluorescens* was up to dilution of 1:200, and at 1:100 in respect of *Leuciscus idus*.

The effluent characterized above was subjected respectively to:
(a) a hydrogen peroxide-oxidation in the presence of respectively the same quantity of iron (II)—sulphate,
(b) a flocculation and precipitation process using $FeSO_4.7H_2O$ as the flocculant, and
(c) a combination of the hydrogen peroxide treatment according to (a) with the subsequent flocculation and precipitation process according to (b). (Proportions always being based on 1 l of effluent).

(a) Hydrogen peroxide-oxidation

1. Addition of 26.19 g of $FeSO_4.7H_2O$
2. pH-adjustment using milk of lime to pH 4.0
3. Addition of 96.1 g of 50% $H_2O_2$
   This was stirred for 1 hour at approximately 25° C.
The COD of the effluent treated thus was:
   COD: 45,888 mg/l (b) Flocculation and Preciptation 1. Addition of 26.19 g of $FeSO_4.7H_2O$
2. Stirring for 15 minutes at approximately 25° C.
3. Neutralization using milk of lime to pH 7.5
4. Separating the sediment and adjusting the same using milk of lime to pH value 11
5. Filtration
   The COD of the combined filtrates was:
   COD: 45,100 mg/l (c) Combination of hydrogen peroxide treatment and flocculation and precipitation process 1. Addition of 26.19 g of $FeSO_4.7H_2O$ 2. pH adjustment using milk of lime to pH 4.0
3. Addition of 96 g of 50% $H_2O_2$
4. Stirring for 60 minutes at approximately 25° C.
5. Neutralization using milk of lime to pH value 7.5
6. Separating the sediment and adjusting the same using milk of lime to pH value 11
7. Filtration
   The COD of the combined filtrates was:
   COD: 17,600 mg/l
   This effluent was subjected to a subsequent biological effluent purification process.

EXAMPLE 2

A mixed effluent had the following COD value, $BOD_5$ value and pH value:
COD: 53,210 mg/l
$BOD_5$: 980 mg/l
pH: 8.3

The detrimental effect of this effluent in respect of *Pseudomonas fluorescens* was at 1:150 up to dilution, and at 1:80 in respect of *Leuciscus idus*.

The effluent characterized above was subjected respectively to:
(a) a hydrogen peroxide oxidation in the presence of respectively equal amounts of iron (II)—sulphate,
(b) a flocculation and precipitation process using $FeSO_4.7H_2O_2$ as the auxiliary flocculant, and
a combination of the hydrogen peroxide treatment according to (a) with the subsequent flocculation and precipitation process (b). (Proportions based on 1 l of effluent).

(a) Hydrogen peroxide oxidation

1. Addition of 9.25 g of $FeSO_4.7H_2O$
2. pH adjustment using $H_2SO_4$ to pH value 4.0
3. Addition of 34.0 g of 50% $H_2O_2$ This was stirred for 1 hour at approximately 25° C.
The COD of the effluent treated thus was:
COD: 45,209 mg/l

(b) Flocculation and Precipitation

1. Addition of 9.25 g of $FeSO_4.7H_2O$
2. Stirring for 15 minutes at approximately 25° C.
3. Neutralization using milk of lime to pH value 7.5
4. Separating the sediment and adjusting the same using milk of lime to pH value 11
5. Filtration
   The COD of the combined filtrates was:
   COD: 49 720 mg/l

(c) Combination of hydrogen peroxide treatment and flocculation and precipitation process 1. Addition of 9.25 g of $FeSO_4.7 H_2O$
2. pH adjustment using $H_2SO_4$ to pH value 4.0
3. Addition of 34.0 g of 50% $H_2O_2$
4. Stirring for 60 minutes at approximately 25° C.
5. Neutralization using milk of lime to pH value 7.5
6. Separating the sediment and adjusting the same using milk of lime to pH value 11
7. Filtration
   The COD of the combined filtrates was:
   COD: 33,120 mg/l
   This effluent was subsequently treated biologically.

It will be appreciated that the instant specification and examples are set forth by way of illustration and not limitation, and that various modifications and changes may be made without departing from the spirit and scope of the present invention.

We claim:

1. In the process for decreasing the COD-content of effluent by treating with hydrogen peroxide in the presence of a transition metal compound, the improvement which comprises adding to the effluent about 5 to 40% of the calculated quantity of $H_2O_2$ required for the total oxidation of the total COD-content of the effluent, the transition metal compound being dissolved in the effluent in an amount such that the molar ratio of $H_2O_2$ to transition metal is from about 30:1 to 3:1, bringing the pH initially to about 2 to 9, maintaining the effluent at about 5° to 100° C., separating from the effluent whatever material has flocculated, and after the removal of the flocculated material the effluent is subjected to biological degradation.

2. A process according to claim 1, wherein the starting pH value is from about 3.5 to 6.5.

3. A process according to claim 1, wherein about 10 to 35% of the calculated quantity of $H_2O_2$ required for the total oxidation of the total COD-content of the effluent is added to the effluent.

4. A process according to claim 1, wherein the transition metal comprises at least one of copper, aluminum, zinc and iron.

5. A process according to claim 1, wherein the transition metal compound is present in an amount such that the molar ratio of the hydrogen peroxide to the transition metal compound in the effluent is from about 20:1 to 10:1.

6. A process according to claim 1, wherein the starting pH is from about 4 to 5, about 15 to 30% of the calculated quantity of $H_2O_2$ required for the total oxidation of the total COD-content of the effluent is added to the effluent, the transition metal comprises iron and it is present in an amount such that the molar ratio of the hydrogen peroxide to the transition metal in the effluent is from about 18:1 to 13:1, a base is added to the effluent prior to removal of the flocculated material.

* * * * *